July 16, 1968 W. J. SIEGEL 3,392,897
SOLDER EXTRACTOR
Filed Sept. 23, 1966 2 Sheets-Sheet 2
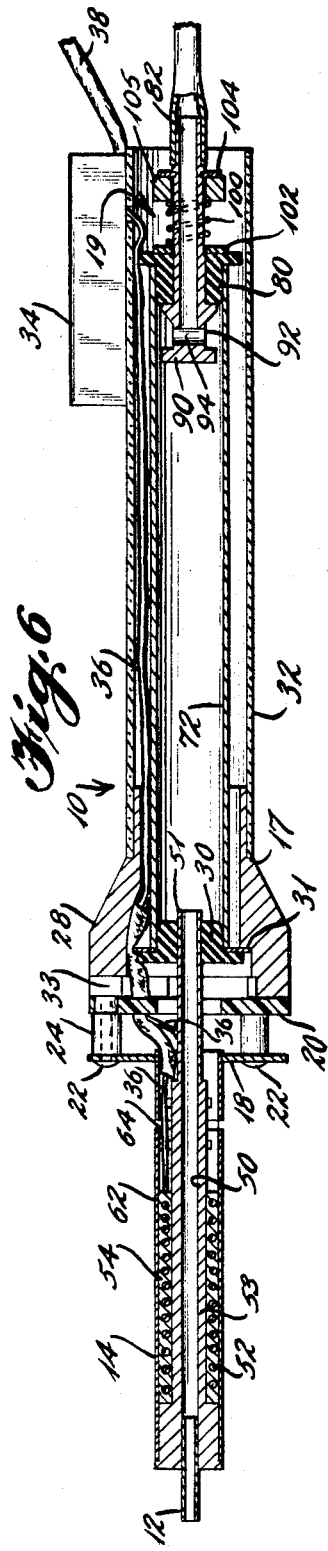
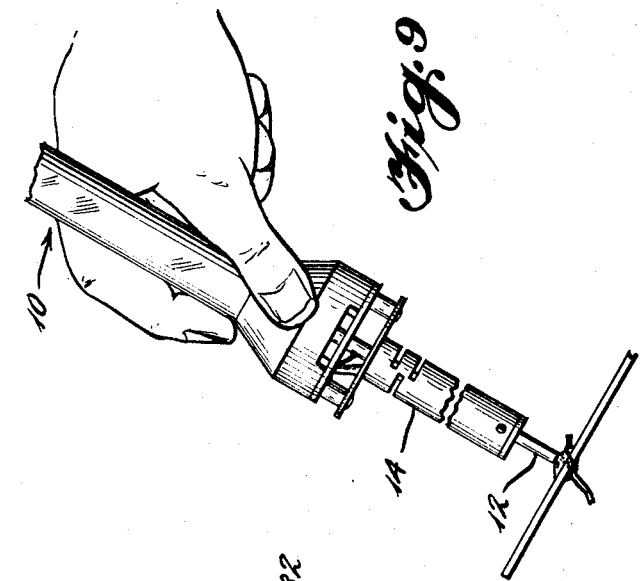
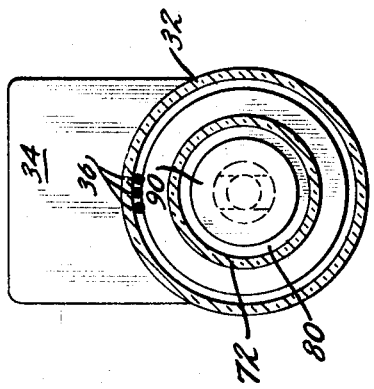
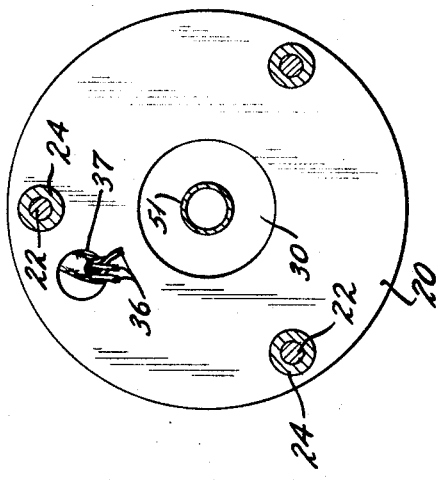

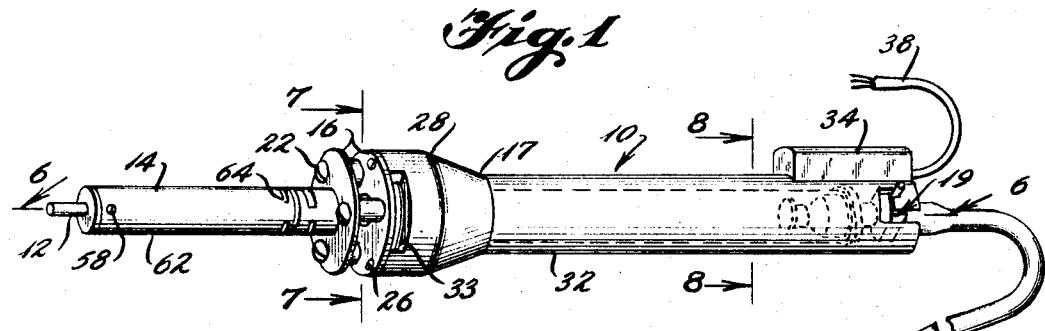
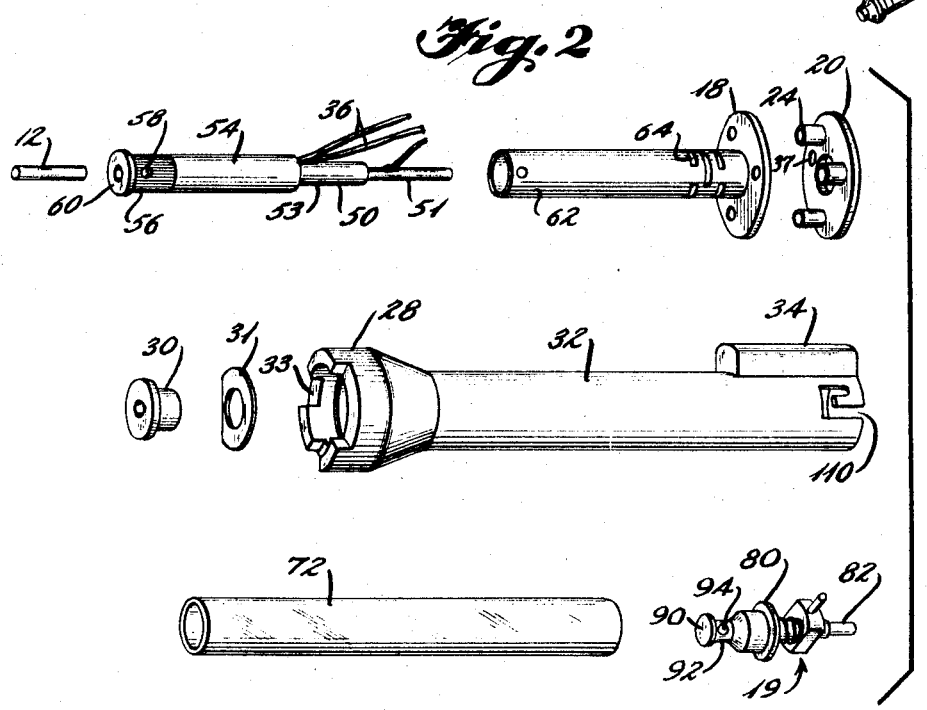
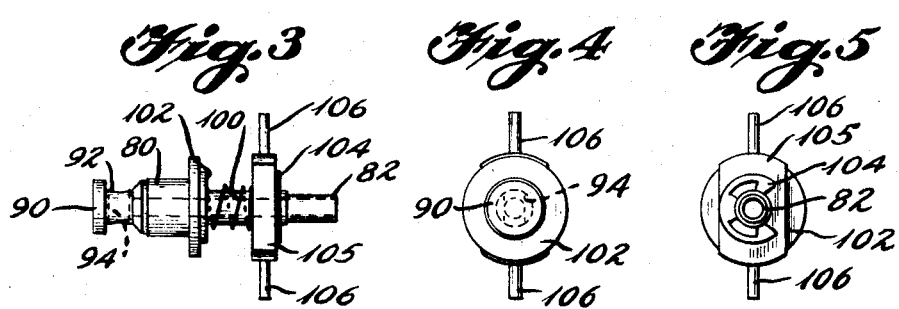

United States Patent Office 3,392,897
Patented July 16, 1968

---

3,392,897
SOLDER EXTRACTOR
William Jordan Siegel, 814 E. Franklin Ave.,
Silver Spring, Md. 20901
Filed Sept. 23, 1966, Ser. No. 581,621
7 Claims. (Cl. 228—20)

The present invention relates to an improved solder extractor.

Repair of electronic equipment often involves need to remove solder fillets and joints efficiently without otherwise affecting the circuit as a whole or the components therein. Generally speaking solder extraction is done by applying the front end of a heated tubular member to a soldered area to melt the solder. Then suction applied to the rear end of the tubular member draws the molten solder off into the tube.

The present invention provides an efficient, readily manipulated solder extractor. It is a co-axial instrument of pencil type construction in which a tubular heated tip, a heat generating element, a molten solder receiving chamber, and a gripping handle are all disposed either concentric or in axial succession one to the other, with an axial passageway front to rear for flow of extracted solder. This co-axial, pencil type construction, offers many advantages for solder removal, of which the most noteworthy are:

(1) the molten solder moves in a stright line (without bends) thereby avoiding the possibility of blockage or wear at bend regions and providing a good suction effect from the vacuum source;
(2) the solder extractor as a whole is light and well balanced; a pencil like grip permits close, accurate control of the heated tip with less danger of burn damage to the circuit and components at areas near the solder being removed;
(3) the solder extractor can be readily applied to work pieces that have nearby encumberances such as upstanding circuit components;
(4) Radiation and convection heating effects on the work piece are minimized.

Other advantageous structural and operational aspects of the solder extractor of the present invention will become more apparent from the detailed description thereof which follows.

Referring now to the drawings wherein:
FIG. 1 is a perspective view of the solder extractor;
FIG. 2 is an exploded perspective view of the solder extractor;
FIG. 3 is a side elevation of the rear seal assembly;
FIG. 4 is an end view of the rear seal assembly;
FIG. 5 is a back view of the rear seal assembly;
FIG. 6 is a view of the solder extractor taken along line 6—6 of FIG. 1;
FIG. 7 is a cross-section taken along line 7—7 of FIG. 1; and
FIG. 8 is a cross-section taken along line 8—8 of FIG. 1;
FIG. 9 is a view of the solder extractor in operation.

Referring now to the drawings, it may be seen that solder extractor 10 comprises a removable tubular tip 12 which extends axially forward from a heater assembly 14. Axially rearward from heater assembly 14 is thermal baffle assembly 16, then handle assembly 17 and finally a vacuum fitting assembly 19.

Referring back then to heater assembly 14 and in particular to the exploded view thereof in FIG. 2, it may be seen that a metallic tube 50 has a resistance wire heating element 52 wound thereabout and an insulating ceramic 54 around the resistance wire. Desirably tube 50 is formed by machining down one end of a bi-metallic tubular blank, having an outside tube of copper and an inner thinner tube of steel, to the relatively thin steel tube at rear end portion 51. At the untouched central portion 53 of the copper-steel bi-metallic tube resistance wire 52 and ceramic insulator 54 are placed. A relatively thick tubular end piece which may be knurled is press fitted on the other end of the bi-metallic tube. A terminal shoulder or flange 60 on which sleeve 62 seats is provided on the thick forward end portion 56 of tube 50. A tapped threaded radial opening 58 is provided in end portion 56 so that removable tubular heating tip 12 inserted axially into tube 50 may be locked in place by a set screw. A corresponding opening is present in the sleeve 62 to provide access to the set screw in radial opening 58 in tube 50.

Desirably the outside diameter of ceramic insulator 54 is made slightly smaller than the internal diameter of sleeve 62 so that when metallic sleeve 62 is press fitted on end portion 56, and seated against shoulder 60 it is spaced annularly apart from ceramic insulator 54. Mica insulation may be interposed between ceramic 54 and sleeve 62.

A plurality of elongated circumferential slits 64 cut into sleeve 62 near the rearward terminus thereof provide a substantial thermal barrier between the front and rear ends of sleeve 62 through their provision for air vents to the inside of sleeve 62 and by actual removal of metal which would otherwise condut heat lengthwise of sleeve 62 to the rearmost terminus thereof. In similar fashion the thin character of the wall at rear portion 51 of tube 50 acts to diminish conduction of heat rearward from resistance heater wire 52.

Axially rearward of sleeve 62 is thermal barrier assembly 16 formed by a pair of axially spaced apart circular plates 18 (metal) and 20 (non-metallic). Plates 18, 20 each have a relatively large central aperture therein. The plates 18 and 20 are maintained in their spaced apart relation by a plurality of screws 22 (or bolts) and spacer elements 24 symmetrically disposed near the periphery of plates 18, 20. At its rearward terminus sleeve 62 is attached (e.g. press fit, swaged, etc.) to plate 18 at the bounding edge of its central aperture. The essentially open air space provided between plates 18, 20 constitutes an efficient thermal insulation between sleeve 62 and the handle assembly 17 of solder extractor 10. Moreover the same air space acts to cool the exposed rear portion 51 of central tube 50 which extends through the central apertures of plates 18, 20. Thermal barrier 16 thus creates a substantial temperature drop between the terminus of sleeve 62 and handle 17 allowing the user to hold handle 17 and operate the solder extractor 10 without discomfort.

A hollow hub 28, desirably of non-metallic construction (e.g. wood, bakelite), is mounted, as by screws 26 on the back face of plate 20. The rearmost extent of tube 50 passes through the central aperture in plate 20 to a termination inside hub 28 at a forward seal 30 (desirably of silicone rubber). Seal 30 is disposed between the bounding edges of the central aperture on plate 20 and hub 28 being maintained firmly in position there by a washer member 31 which bears against the flanged rim of seal 30 and the body of hub 28 at recesses 33 therein.

Rearwardly of hub 28 from a circular seat thereon extends tubular handle grip 32 which may be formed of glass or of a transparent plastic. Handle grip 32 and hub 28 are the held parts of solder extractor 10. The power supply cord 38 ends at a junction box 34 mounted at the end of grip 32. From junction box 34 electrical leads 36 pass inside handle grip 32 then internally of hub 28, through an aperture 37 in plate 20 and inside of sleeve 62 to the resistance wire heating element 52. A voltage control device (not shown) may be mounted in junction box 34 if one is required. Also, the ground wire may be grounded to rear portion 51 of tube 50.

Mention has already been made of how central tube 50 extends rearwardly into hub 28 to forward seal 30. Seated on forward seal 30 (as shown in FIG. 6) is a solder catcher tube 72. This solder catcher tube 72 comprises an elongated open cylinder which is sealed at its forward end by seating on forward seal 30 and at its rearward end by seating on the hollow (rubber) rear seal 80. A straight-line axial passage for flow of molten solder is provided by tip 12, tube 50 and solder catcher tube 72. Conversely, application of vacuum to vacuum fitting assembly 19 at the rear of solder catcher 72 efficiently transmits suction to the forward end of tip 12.

The vacuum fitting assembly 19 includes rear seal 80. Extending therethrough is baffle tube 82 whose front end is shaped into a flat imperforate base 90 and a reduced neck 92 having a radial hole 94. Rearward of seal 80 is a spring biased bayonet lock formed by a spring 100, spring plate 102, a grooved stop or retainer 104 and lock member 105 and ears 106. The vacuum fitting assembly serves to retain solder catcher tube 72 concentric inside handle grip 32 but readily removable therefrom.

For insertion, the solder catcher tube 72 is pushed onto rear seal 80 of vacuum fitting assembly 19 and then the tube and assembly inserted into handle grip 32 from its open rear end, then pressed down on forward seal 30 with the bayonet lock ears 106 being guided down in locking slits 110 on handle grip 32 and thereafter rotated into the locking position illustrated in the drawing. A suitable source of vacuum may be applied to the rear end of baffle tube 82 via vacuum fitting assembly 19. The suction is effectively applied through the central bore of heating tube 50 clear to the tubular heating tip 12.

From the foregoing description, it may readily be seen how all of the important functions of the solder extractor have been advantageously combined in a pencil type tool. The heat generated by heating element 52 just behind tip 12 passes forward by good metallic conduction to the forward end of tip 12. Rearwardly the thermal profile of solder extractor shows a moderate fall along the length of sleeve 62 from the maximum temperature level at the heated forward end of tube 50. A substantial temperature drop (several hundred degrees) occurs across radial slits 64. Then occurs another sharp drop in temperature across thermal barrier 16. As a result non-metallic circular plate 20 and the hub 28 are not subjected to ruinous temperature levels; the handle grip 32 and hub 28 may be held comfortably by the bare hand as illustrated in FIGURE 9.

In operation of solder extractor 10, the application of vacuum thereto is normally intermittent (and can be controlled by a suitable foot pedal arrangement). Usually the operator applies the hot tip 12 at the soldered connection long enough to melt the solder, then initiates a blast of suction which draws the now molten solder up through tip 12 and tube 50 into solder catcher 72. Often the still molten solder is drawn up with such force as to splatter against flat imperforate face 90 at the rear of solder catcher 72, solidifying both there and on the adjacent wall of solder catcher tube 72. The ready removability of solder catcher 72 permits the collected solder to be disposed of periodically.

It should be appreciated that the foregoing description of the invention has been made in terms of preferred construction and operation thereof, and that changes as will suggest themselves to the skilled in the art are contemplated within the scope of the hereto appended claims.

What is claimed is:

1. A solder extractor of pencil like construction having a straight-line axial passage front to rear for flow of extracted molten solder which comprises in axial succession front to rear: a hollow desoldering tip; a heating assembly; a thermal barrier; and a handle assembly;

said heating assembly further comprising an elongated central tube, a tubular sleeve concentric therewith and radially spaced apart therefrom, and an electrical heating element disposed between tube and sleeve at front portions thereof, the rear portions thereof having an annular air gap therebetween, said sleeve terminating at the thermal barrier;

said thermal barrier further comprising an air space disposed between the rear end of said sleeve and the front end of said handle assembly, with said central tube extending axially through said air space to a terminus in the handle assembly;

said handle assembly further comprising a hollow hub and a hollow cylindrical grip member extending rearwardly of the hub, said hub and grip having disposed a forward seal in which said central tube terminates, a solder catcher tube seated and sealed at its forward end on said forward seal, and a rear end seal and vacuum fitting sealing the rear end of said solder catcher tube, said fitting being adapted for attachment to an outside source of vacuum;

said axial passage front to rear extending thereby from the forward end of said hollow desoldering tip to the rearward end seal of said solder catcher tube.

2. The solder extractor of claim 1 wherein the electrical power connection extends forward from the rear of said grip member: inside the annular space between said solder catcher tube and the cylindrical grip member; through the air space of said thermal barrier; and in the annular space between said central tube and said sleeve to said electrical heating element.

3. The solder extractor of claim 1 wherein said tip is removably secured to the forward end portion of said central tube.

4. The solder extractor of claim 1 wherein said central tube is of varying thickness and the rearmost portion thereof is a thin walled tube.

5. The solder extractor of claim 1 wherein said sleeve has provided adjacent the rear terminus thereof a plurality of circumferential slits for retarding conduction of heat rearwardly of said sleeve.

6. A solder extractor of pencil like construction having a straight-line axial passage front to rear for flow of extracted molten solder which comprises in axial succession front to rear: a hollow desoldering tip; a heating assembly; a thermal barrier; and a handle assembly;

said heating assembly further comprising an elongated central tube, a tubular sleeve concentric therewith and radially spaced apart therefrom, and an electrical heating element disposed between tube and sleeve at front portions thereof, the rear portions thereof having an annular air gap therebetween, said sleeve terminating at the thermal barrier;

said sleeve having a plurality of circumferential slits therein adjacent the rear terminus thereof;

said thermal barrier further comprising a parallel pair of axially spaced apart centrally apertured plates disposed radially of the central tube, with said central tube extending axially through the apertures to a terminus in the handle assembly, the rear terminus of said sleeve being attached to the forward plate at the central aperture thereof;

said handle assembly further comprising a hollow hub secured to the rearward plate of the thermal barrier and a hollow cylindrical grip member extending rearwardly of the hub, said hub and grip having disposed a forward seal in which said central tube terminates, a solder catcher tube seated and sealed at its forward end on said forward seal, and a rear end seal and vacuum fitting sealing the rear end of said solder catcher tube, said fitting being adapted for attachment to an outside source of vacuum;

said axial passage front to rear extending thereby from the forward end of said hollow desoldering tip to the rearward end seal of said solder catcher tube.

7. The solder extractor of claim 6 wherein said central tube, said sleeve and the forward plate of the thermal barrier are metallic and wherein the rearward plate, said hub and said grip member are non-metallic.

References Cited

UNITED STATES PATENTS

| | | | |
|---|---|---|---|
| 2,826,667 | 3/1958 | Brillinger | 228—20 |
| 559,511 | 5/1896 | Burns et al. | 228—20 |

RICHARD H. EANES, JR., *Primary Examiner.*